US006912144B1

(12) United States Patent
Clavette

(10) Patent No.: US 6,912,144 B1
(45) Date of Patent: Jun. 28, 2005

(54) METHOD AND APPARATUS FOR ADJUSTING CURRENT AMONGST PHASES OF A MULTI-PHASE CONVERTER

(75) Inventor: Dan Clavette, Greene, RI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/921,459

(22) Filed: Aug. 19, 2004

(51) Int. Cl.$^7$ ................................................ H02M 3/24
(52) U.S. Cl. ........................................ 363/98; 323/283
(58) Field of Search ............................. 363/98, 97, 72, 363/132, 21.18; 323/282–285, 272, 288

(56) References Cited

U.S. PATENT DOCUMENTS

| | | | | |
|---|---|---|---|---|
| 5,861,738 A | * | 1/1999 | Becker-Irvin et al. | 323/282 |
| 6,130,828 A | * | 10/2000 | Rozman | 363/21.06 |
| 6,204,649 B1 | * | 3/2001 | Roman | 323/282 |
| 6,246,222 B1 | * | 6/2001 | Nilles et al. | 323/283 |
| 6,278,263 B1 | * | 8/2001 | Walters et al. | 323/272 |
| 6,282,111 B1 | * | 8/2001 | Illingworth | 363/98 |
| 6,414,470 B1 | * | 7/2002 | Liu et al. | 323/272 |
| 6,522,115 B1 | * | 2/2003 | Greitschus | 323/288 |
| 6,574,124 B2 | * | 6/2003 | Lin et al. | 363/65 |
| 6,674,274 B2 | * | 1/2004 | Hobrecht et al. | 323/285 |
| 6,678,178 B2 | * | 1/2004 | Lipcsei | 363/98 |
| 6,760,238 B2 | * | 7/2004 | Charych | 363/97 |

* cited by examiner

*Primary Examiner*—Michael Tokar
*Assistant Examiner*—Linh V. Nguyen

(74) *Attorney, Agent, or Firm*—Ostrolenk, Faber, Gerb & Soffen, LLP

(57) ABSTRACT

A multiple-phase DC—DC converter has a first series circuit comprising first and second output transistors coupled across an input voltage, a first phase voltage being provided at a first common connection between the first and second transistors, at least one second series circuit comprising third and fourth output transistors coupled in series across the input voltage, a second phase voltage being provided at a second common connection between the third and fourth transistors, a first output inductor for the first phase, at least one second output inductor for the at least one second phase, an output capacitor, a first pulse width modulator circuit comprising a first pulse width modulator comparator and a first fixed slope ramp generator, the first fixed slope ramp generator supplying a fixed slope ramp signal to one input of the first comparator, at least one second pulse width modulator circuit comprising a second pulse width modulator comparator and a variable slope ramp generator, the variable slope ramp generator supplying a variable slope ramp signal to one input of the second comparator, an error amplifier for comparing the output voltage of the converter to a reference voltage and providing an error amplifier output voltage to respective second terminals of each of the first and at least one second pulse width modulator comparators, a first current sense amplifier for determining the phase current in a first phase of the converter provided by the first series circuit, at least one second current sense amplifier for determining the phase current in at least one second phase of the converter provided by the at least one second series circuit and at least one share adjust amplifier for receiving outputs from each of the first and second current sense amplifiers and adjusting the slope of the variable slope ramp signal to adjust the current provided by the at least one second series circuit thereby to equalize the currents provided by the first and at least one second phases.

21 Claims, 8 Drawing Sheets

METHOD AND APPARATUS FOR ADJUSTING CURRENT AMONGST PHASES OF A MULTI-PHASE CONVERTER

BACKGROUND OF THE INVENTION

The present invention relates to power supplies, and in particular, to multiphase converter power supplies, and even more particularly, to a multi-phase buck converter power supply for providing low voltage, high current power to such devices as portable computers such as notebook and laptop computers.

Multi-phase buck converter switching power supplies are now in use for providing low voltage, high current, high efficiency power supplies for such applications as portable computers, for example, laptops and notebook computers.

The present invention relates to a multi-phase converter power supply wherein current amongst two or more phases is automatically adjusted so that the multiple phases automatically adjust to share in the electrical current demanded by the load. Thus, the present invention provides a method and apparatus for allowing the multiple phases of a multi-phase buck converter power supply to share equally in providing power to the load. Thus, according to the present invention, if higher current is being demanded in one phase, the apparatus of the invention will automatically adjust the other phases so that the current supplied to the load is shared equally. Similarly, if a phase current demand is reduced, the other phases will be reduced accordingly.

In the prior art, IR's X-phase converter chips for buck converter power supplies are known. For example, the IR308X Series chip is known. In that chip series, a control chip controls a plurality of phase chips. Each phase chip drives a single phase of the multi-phase converter which are coupled to the DC output bus. For a two or three phase converter, two or three phase chips are used, respectively. However, for a two or three phase converter, there is more complexity than is necessary using these integrated circuits and multiple chips need to be used. Use of multiple chips provides flexibility for a converter having many phases, but is not necessary for a two or three phase converter. In particular, each integrated circuit in the X-phase series includes a current share adjust amplifier to ensure that the currents are shared equally by the phases. For a two or three phase converter, it is desirable to have a simpler system to ensure that the currents are shared by the multiple phases. In particular, it is desirable to reduce the number of error amplifiers used to achieve current sharing and to reduce the number of chips.

SUMMARY OF THE INVENTION

It is accordingly an object of the present invention to provide a system for ensuring that the currents of each phase in a multi-phase converter are shared equally.

The above and other objects of the invention are achieved by a multiple phase DC—DC converter comprising a first series circuit comprising first and second output transistors coupled across an input voltage, a first output terminal comprising a first phase voltage being provided at a first common connection between the first and second transistors, at least one second series circuit comprising third and fourth output transistors coupled in series across the input voltage, a second output terminal comprising a second phase voltage being provided at a second common connection between the third and fourth transistors of the second series circuit, a first output inductor coupled between the first output terminal and an output voltage terminal of the converter, at least one second output inductor coupled between the second output terminal and the output voltage terminal of the converter, an output capacitor coupled to the output voltage terminal, a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first PWM comparator, at least one second pulse width modulator circuit for driving the third and fourth transistors, the at least one second pulse width modulator circuit comprising a second pulse width modulator comparator and a variable slope ramp generator, the variable slope ramp generator supplying a variable slope ramp signal to one input of the second PWM comparator, an error amplifier for comparing the output voltage of the converter to a reference voltage and providing an error amplifier output voltage to respective second terminals of each of the first and second PWM comparators, a first current sense amplifier for determining the phase current in a first phase of the converter provided by the first series circuit, at least one second current sense amplifier for determining the phase current in at least one second phase of the converter provided by the at least one second series circuit, and at least one share adjust amplifier for receiving outputs from each of the first and at least one second current sense amplifiers and adjusting the slope of the variable slope ramp signal provided by the variable slope ramp generator to adjust the current provided by the at least one second series circuit thereby to equalize the currents provided by the first and at least one second phases.

The objects of the invention are also achieved by a two-phase DC—DC converter comprising a first series circuit comprising first and second output transistors coupled across an input voltage, a first output terminal comprising a first phase voltage being provided at a first common connection between the first and second transistors, a second series circuit comprising third and fourth output transistors coupled in series across the input voltage, a second output terminal comprising a second phase voltage being provided at a second common connection between the third and fourth transistors, a first output inductor coupled between the first output terminal and an output voltage terminal of the converter, a second output inductor coupled between the second output terminal and the output voltage terminal of the converter, an output capacitor coupled to the output voltage terminal, a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first pulse width modulator comparator, a second pulse width modulator circuit for driving the third and fourth transistors, the second pulse width modulator circuit comprising a second pulse width modulator comparator and a variable slope ramp generator, the variable slope ramp generator supplying a variable slope ramp signal to one input of the second pulse width modulator comparator, an error amplifier for comparing the output voltage of the converter to a reference voltage and providing an error amplifier output voltage to respective second terminals of each of the first and second pulse width modulator comparators, a first current sense amplifier for determining the phase current in a first phase of the converter provided by the first and second transistors, a second current sense amplifier for determining the phase current in a second phase of the converter provided by the third and fourth transistors, and a share adjust amplifier for receiving outputs from each of the first and second current sense amplifiers and adjusting the slope of the variable slope ramp signal provided by the variable slope ramp generator to adjust the current provided by the third and fourth transistors thereby to equalize the currents provided by the first and second phases.

The objects of the invention are furthermore achieved by a method of equalizing load current amongst the output phases of a multiple phase converter, wherein the converter comprises a first series circuit comprising first and second output transistors coupled across an input voltage, a first output terminal comprising a first phase voltage being provided at a first common connection between the first and second transistors; at least one second series circuit comprising third and fourth output transistors coupled in series across the input voltage, a second output terminal comprising a second phase voltage being provided at a second common connection between the third and fourth transistors; a first output inductor coupled between the first output terminal and an output voltage terminal of the converter; at least one second output inductor coupled between the second output terminal and the output voltage terminal of the converter; and an output capacitor coupled to the output voltage terminal, the method comprising comparing the output voltage of the converter to a reference voltage and providing an error amplifier output voltage to each of first and at least one second pulse width modulator comparators, comparing with the first pulse width modulator comparator a first fixed slope ramp signal with the error amplifier output, comparing with the at least one second pulse width modulator comparator a variable slope ramp signal with the error amplifier output, determining the phase current in a first phase of the converter provided by the first series circuit, determining the phase current in at least one second phase of the converter provided by the at least one second series circuit; and in response to the determined currents in the first phase and the at least one second phase adjusting the slope of the variable slope ramp signal to adjust the current provided by the at least one second series circuit thereby to equalize the currents provided by the first and at least one second phases.

The objects of the invention are also achieved by a three phase DC—DC converter comprising a first series circuit comprising first and second output transistors coupled across an input voltage, a first output terminal comprising a first phase voltage being provided at a first common connection between the first and second transistors, a second series circuit comprising third and fourth output transistors coupled in series across the input voltage, a second output terminal comprising a second phase voltage being provided at a second common connection between the third and fourth transistors, a third series circuit comprising fifth and sixth output transistors coupled in series across the input voltage, a third output terminal comprising a third phase voltage being provided at a third common connection between the fifth and sixth transistors, a first output inductor coupled between the first output terminal and an output voltage terminal of the converter, a second output inductor coupled between the second output terminal and the output voltage terminal of the converter, a third output inductor coupled between the third output terminal and the output voltage terminal of the converter, an output capacitor coupled to the output voltage terminal, a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first pulse width modulator comparator, a second pulse width modulator circuit for driving the third and fourth transistors, the second pulse width modulator circuit comprising a second pulse width modulator comparator and a first variable slope ramp generator, the first variable slope ramp generator supplying a is first variable slope ramp signal to one input of the second pulse width modulator comparator, a third pulse width modulator circuit for driving the fifth and sixth transistors, the third pulse width modulator circuit comprising a third pulse width modulator comparator and a second variable slope ramp generator, the second variable slope ramp generator supplying a second variable slope ramp signal to one input of the third pulse width modulator comparator, an error amplifier for comparing the output voltage of the converter to a reference voltage and providing an error amplifier output voltage to respective second terminals of each of the first, second and third pulse width modulator comparators, a first current sense amplifier for determining the phase current in a first phase of the converter provided by the first and second transistors, a second current sense amplifier for determining the phase current in a second phase of the converter provided by the third and fourth transistors and a third current sense amplifier for determining the phase current in a third phase of the converter provided by the fifth and sixth transistors, a first share adjust amplifier for receiving outputs from each of the first and second current sense amplifiers and adjusting the slope of the first variable slope ramp signal provided by the first variable slope ramp generator to adjust the current provided by the third and fourth transistors, a second share adjust amplifier for receiving outputs from each of the first and third current sense amplifier and adjusting the slope of the second variable slope ramp signal provided by the second variable slope ramp generator to adjust the current provided by the fifth and sixth transistors, thereby equalizing the currents provided by the first, second and third phases.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which.

DETAILED DESCRIPTION OF PREFERRED EMBODIMENTS OF THE INVENTION

Figure 1A:
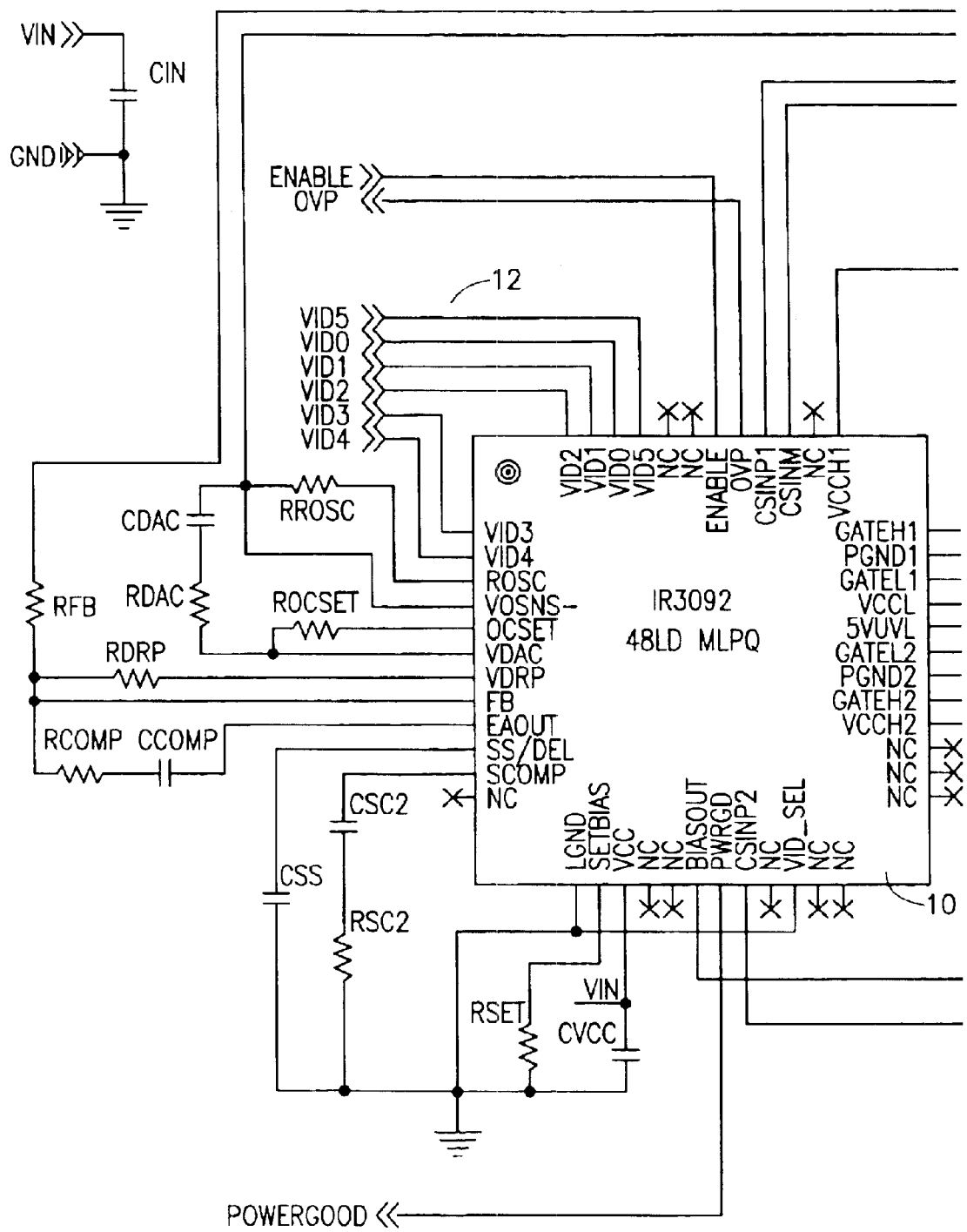
FIG. 1 shows an overall schematic diagram of a two phase converter and, in particular, for providing power to a portable computer such as a laptop.
Figure 1B:
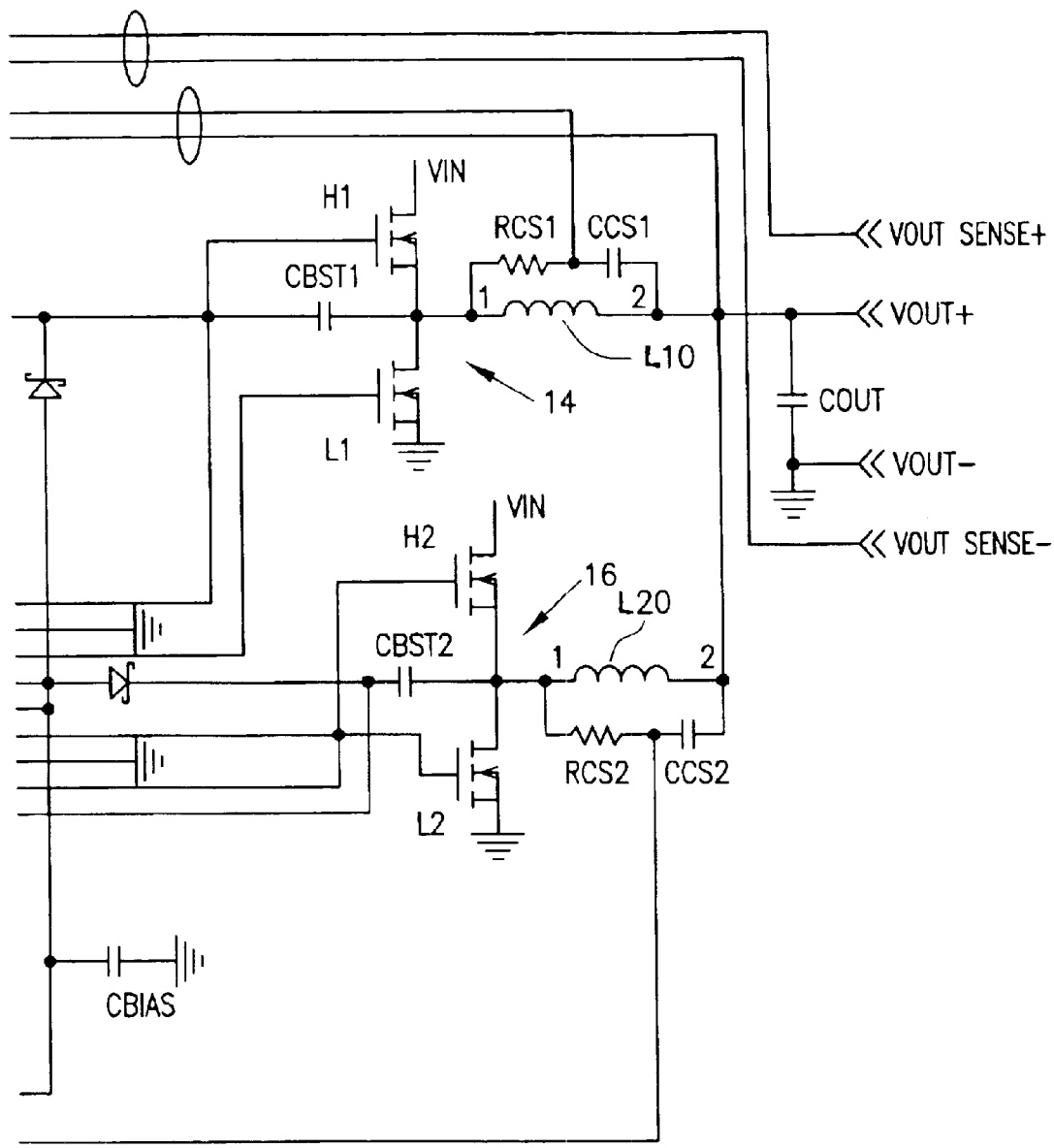

With reference to FIG. 1, the block diagram for a two-phase buck converter is shown. A control chip 10, whose block diagram is described with respect to FIG. 2 in more detail, receives a number of digital inputs VID0–VID5 referenced with 12 in FIG. 1. The VID inputs are received from the microprocessor being powered and are digital bits that will set the voltage output of the converter under various conditions. For example, for an Intel VR10 chip, the output voltage varies between 0.8375V and 1.6000V depending on the setting of the digital bits on VID0 to VID5, as determined by the chip manufacturer. A pin VID_SEL is used to indicate which processor chip is being powered, and this will enable control chip 10 to interpret the VID codes. For example, if VID SEL is grounded, the processor chip is an INTEL VR10 and the VID codes will be interpreted to provide the proper voltage for this chip. If VID_SEL is at VCC, the processor is an AMD ATHLON. If VID_SEL is left open, the processor is an AMD HAMMER. For the ANTHLON chip, the Vout range is from 1.100 to 1.850V. For the AMD HAMMER chip, the VOUT range is from 0.800 TO 1.550V. For all three processors, when all VID bits are 1, VOUT is disabled or OFF.

Power is provided at VIN from a suitable power source, typically a battery or an AC–DC transformer/rectifier. The control chip 10 has outputs GATE H1 and GATE L1 for driving the high side and low side transistors, respectively, of a first phase of the multi-phase converter identified at 14. Transistor H1 is the high side transistor and transistor L1 is the low side transistor.

Outputs GATE H2 and GATE L2 drive the second phase 16 comprising a high side transistor H2 and a low side transistor L2. Each set of transistors are arranged in a half bridge arrangement and their common connection is provided to respective output inductors L10 and L20. The other ends of inductors L10 and L20 are coupled together at a common output node VOUT+. The output is taken across an output capacitor COUT coupled between VOUT+ and ground (VOUT−).

The output voltage is sensed between VOUTSNS+ and VOUTSNS− which are respectively applied to a feedback FB input and VOSNS− input of the control chip 10. Current senses for each phase are provided at inputs CSINP1 and CSINP2, respectively. The current is sensed through lossless average inductor current sensing. The series resistor RCS1 and capacitor CCS1 for phase one are connected in series across the inductor L10. The voltage across the capacitor is sensed. The resistor RCS1 and capacitor CCS1 are chosen so that the time constant of RCS1 and CCS1 equals the time constant of the inductor which is the inductance of L10 divided by the inductor DC resistance. When the two time constants match, the voltage across CCS1 is proportional to the current in L10 and the sense circuit can be treated as if only a sense resistor with the value of RL (the DC resistance of L10) was used. A mismatch of the time constants does not affect the measurement of inductor DC current but affects the AC component of the inductor current. The advantage of sensing the inductor current verses high side or low side sensing is that actual output current being delivered to the load is sensed rather than peak or sampled information about the switch currents. The output voltage can be positioned to meet a load line based on real time information. Except for a sense resistor in series with the inductor, this is the only sense method that can support a single cycle transient response. Other methods provide no information during either load increase (low side sensing) or load decrease (high side sensing). The other phase two has a sensing resistor RCS2 and capacitor CCS2 and functions in the same way.

Figure 2A:
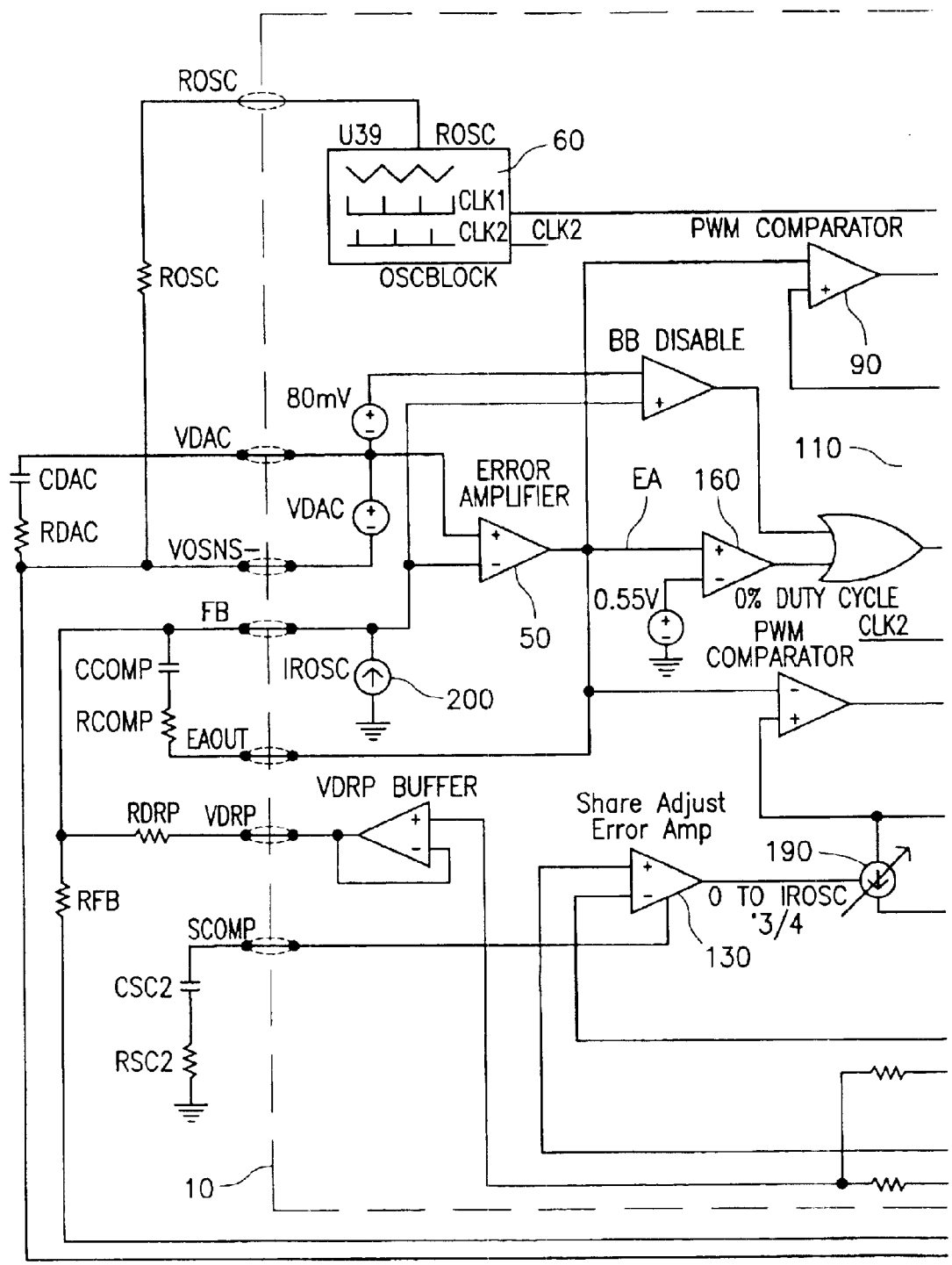
FIG. 2 shows the block diagram of the two phase converter.
Figure 2B:
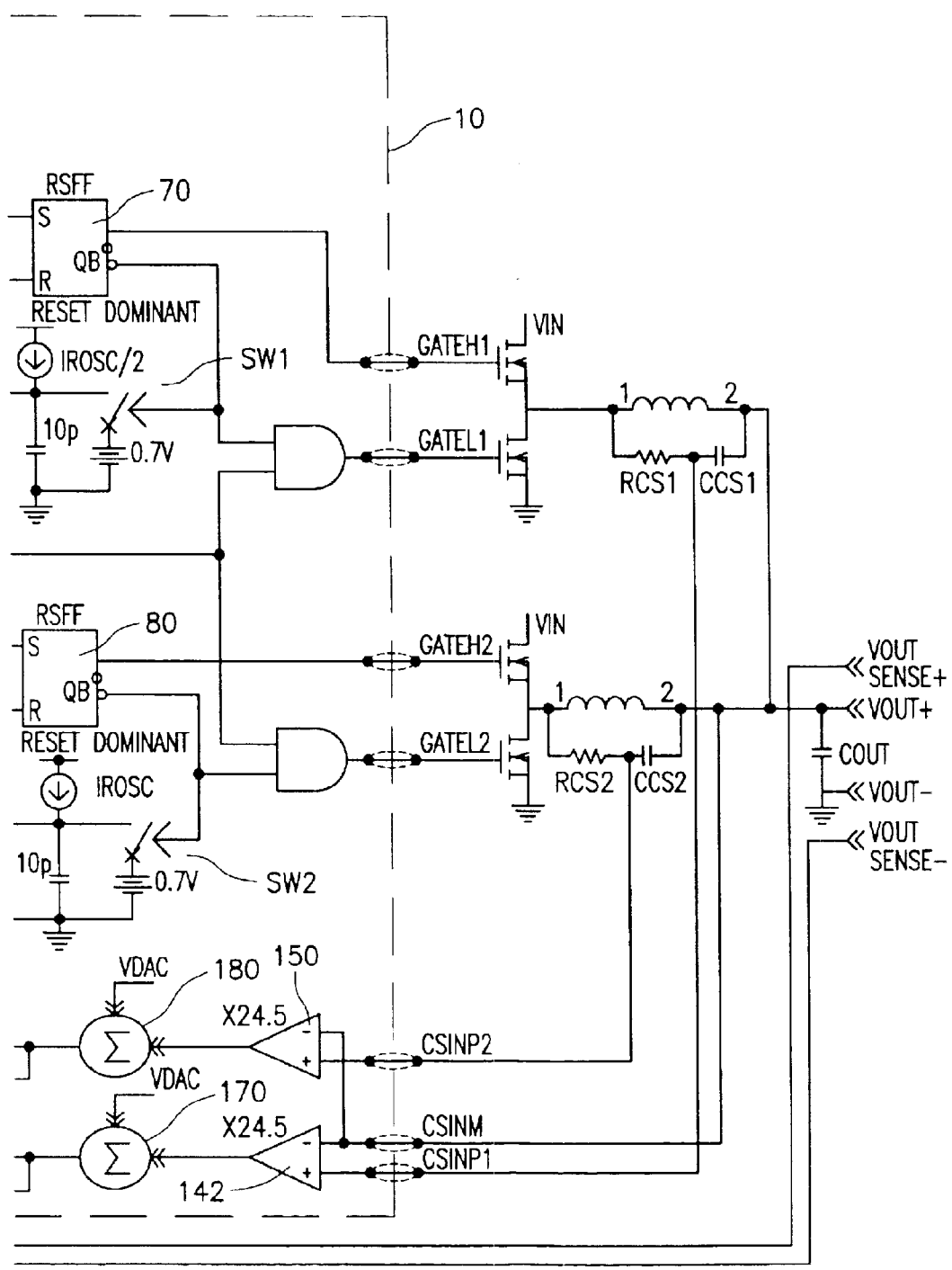

The block diagram of the control chip 10 is shown in more detail in FIG. 2. Voltage mode control with trailing edge modulation is used. A high gain, wide bandwidth voltage type error amplifier 50 is used in a voltage control loop.

Output voltage sensing is provided at input FB which is provided to the inverting input of the error amplifier. The other, noninverting input is coupled to a voltage reference VDAC, which is set by the VID and VID_SEL pins as shown and described with reference to FIG. 1 above. The VID_SEL pin in FIG. 1 is shown grounded for the Intel VR10 chip. For other processors, for example, the AMD HAMMER or ATHLON processors, the VID_SEL pin is connected to a different potential or left open. For the AMD HAMMER processor, VID_SEL is open. For the AMD ATHLON chip, VID_SEL is connected to VCC. The setting of VDAC will determine the reference voltage VDAC for the error amplifier 50, and thus set the output voltage.

The control chip 10 includes an oscillator 60 which is programmable using an external resistor ROSC. The oscillator generates an internal 50 percent duty cycle sawtooth signal as shown in FIG. 3A. The 50 percent duty cycle sawtooth signal of FIG. 3A is used to generate two 180° out of phase timing pulse signals that set the phase 1 and phase 2 RS Flip Flops 70 and 80. The timing pulses are shown in FIGS. 3B and 3C and indicated in FIG. 2 as CLK1 and CLK2.

Figure 3:
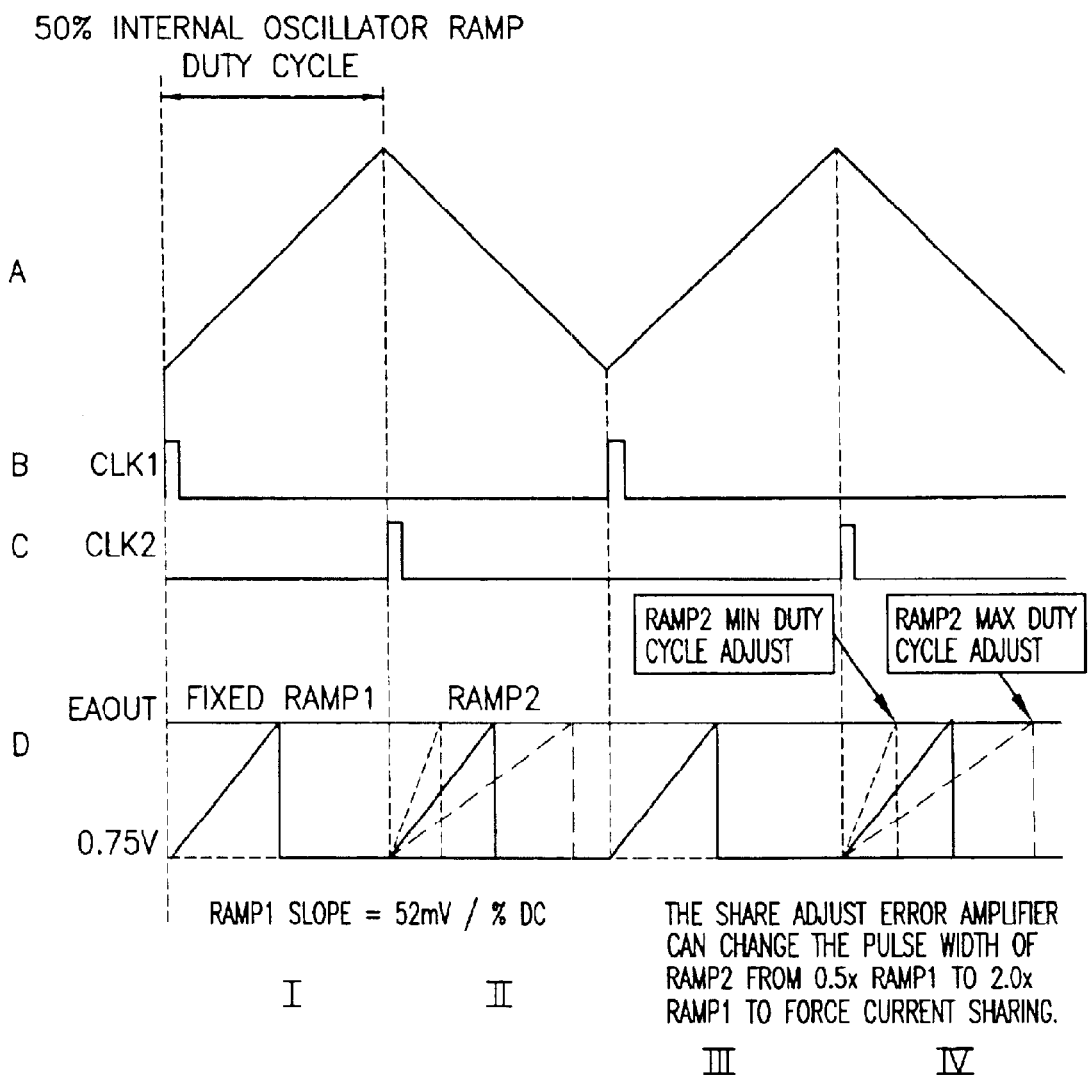
FIG. 3 shows waveforms in the circuit of FIG. 2.

With reference to FIGS. 2 and 3, each flip flop 70 and 80, upon receiving a clock pulse, is set. Furthermore, a respective ramp voltage is provided to respective PWM comparators 90 and 100 at their non-inverting inputs. The error amplifier 50 output is provided to the inverting inputs of each of the PWM comparators. The PWM comparator 90 is provided with a fixed slope ramp voltage provided by current charging through a capacitor 110 from a current source IROSC/2. When the flip flop 70 is set, the low side switch L1 is turned off and the high side switch HI is turned on. See also FIGS. 4A, C and D. A switch SW1 across capacitor 110 is opened by the QB output of Flip Flop 70, allowing the capacitor 110 to begin charging to provide the ramp voltage to PWM comparator 90. Likewise, in the other phase controlled by flip flop 80, the low side driver is turned off and the high side driver turned on upon receiving a clock pulse and a capacitor 120 begins to charge when a switch SW2 is opened by the QB output of flip flop 80.

For phase 1, the capacitor 110 is charged by a current source that is proportional to the switching frequency resulting in a fixed slope ramp rate of approximately 57 milivolts per percent duty cycle. For example, the steady state operating switch mode duty cycle is 10 percent and the internal ramp amplitude is typically 570 milivolts from the starting point to the time when the ramp crosses the output voltage of the error amplifier EAOUT as shown in FIG. 3D. In FIG. 3D, the fixed slope ramp signal provided to the non-inverting input of PWM comparator 90 is shown in the first and third quadrants of the graph.

In contrast, the PWM comparator 100 for the second phase is provided with a variable slope ramp voltage which is shown in the second and fourth quadrants of FIG. 3D and which will be explained in further detail below. For phase 1, when the PWM ramp voltage exceeds the error amplifier output voltage, the flip flop 70 is reset. This turns off the high side switch H I and turns on the low side switch L1 and discharges the PWM ramp to 0.7V until the next clock pulse. Flip Flop 80 and comparator 100 of phase 2 operate in similar fashion, although, as explained below, the slope of the ramp signal provided to the non-inverting input of comparator 100 is variable.

Each flip flop 70, 80 is reset dominant, allowing both phases to go to zero duty cycle within a few tens of nano-seconds in response to a load step decrease.

Phases can overlap and go to 100% duty cycle in response to a load step increase with turn-on gated by the clock voltage. An error amplifier output voltage greater than the common mode input range of the PWM comparator results in 100% duty cycle regardless of the voltage of the PWM ramp. This arrangement ensures that the error amplifier 50 is always in control and can demand 0–100% duty cycle if required. It also favors response to a load step decrease which is appropriate given the low output to input voltage ratio of most systems. The inductor current will increase much more rapidly than decrease in response to load transients.

This control method is designed to provide a single cycle transient response where the inductor current changes in response to load transients within a single switching cycle, maximizing the effectiveness of the power supply and minimizing the output capacitor requirements.

As discussed above, the ramp signals to the comparators 90 and 100 are different. The PWM comparator 90 receives a fixed slope ramp voltage as shown in quadrants I and III of FIG. 3D. The PWM comparator 100, in contrast, receives a variable slope ramp voltage as sown in Quadrants II and IV of FIG. 3D at its non-inverting input. This variable slope ramp voltage is adjusted by a share adjust error amplifier 130 in response to inputs CSRNP1 and CSINP2.

The current sharing between the two phases is achieved by a master-slave current share loop topology. The output of the phase 1 current sense amplifier 140 sets a variable reference for the share adjust error amplifier 130. The share adjust error amplifier will then adjust the duty cycle of the PWM ramp 2 by adjusting its slope, as shown in FIG. 3D by the dashed lines, to force the input error of the share adjust amplifier to zero, resulting in accurate current sharing between the two phases.

The maximum and minimum duty cycle adjust range of ramp 2 compared to ramp 1 in the preferred embodiment is limited to 0.5× and 2.0× the master or fixed slope (phase 1) ramp signal. This is shown by the slope of the ramp voltage provided to the phase 2 PWM comparator 100 in FIG. 3D. Minimum duty cycle is shown by the ramp signal with the highest slope in FIG. 3D. The maximum duty cycle is shown by the ramp with the lowest slope in FIG. 3D.

The cross-over frequency of the current share loop can be programmed with a capacitor at the SCOMP input terminal so that the share loop does not interact with the output voltage loop. The SCOMP capacitor is driven by a transconductance stage capable of sourcing and sinking 25 microamps. The duty cycle of ramp 2 inversely tracks the voltage on the SCOMP pin. If the voltage SCOMP increases, the slope of the ramp provided to PWM comparator 100, that is, the phase 2 comparator, will increase and the respective duty cycle will decrease resulting in a reduction in the output current of phase 2. Due to the limited 25 microamp source current, an SCOMP precharge circuit is included to precondition V(SCOMP) so that the duty cycle of the ramp signal provided to PWM comparator 100 is equal to the duty cycle of ramp 1 prior to any gate pulses provided to the high side transistors.

As shown in FIGS. 2 and 3, the fixed ramp charges from a current source IROSC/2. The variable slope ramp charges at IROSC, but is shunted by a variable current sink 190, that sinks current in a range from 0 to IROSC ×¾. Thus, the range of current charging capacitor 120 ranges from IROSC to IROSC/4, that is, from 2× to ½ the charging rate of capacitor 110 in the fixed slope ramp generator circuit.

Figure 4:
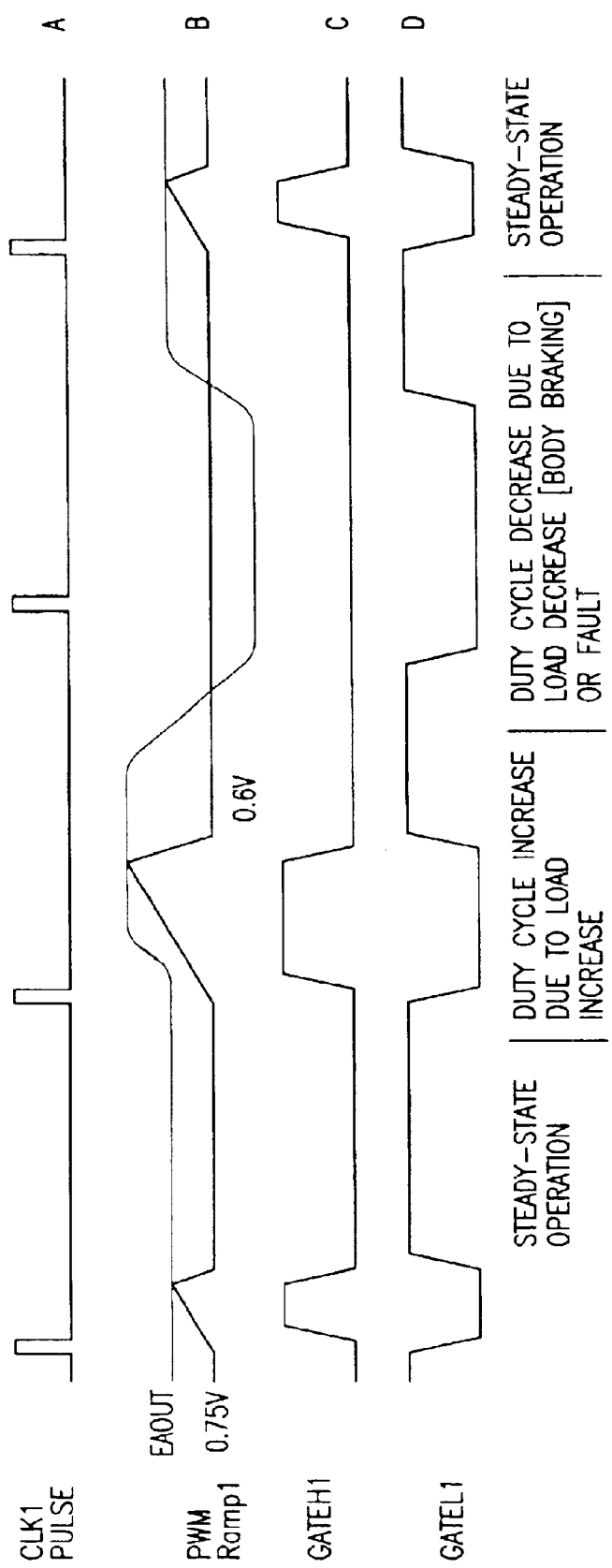
FIG. 4 shows further waveforms of the circuit of FIG. 2.

FIG. 4 depicts the PWM operating wavefornms under various conditions for the first phase. The second phase is similar, except that the PWM ramp 2, unlike PWM ramp 1, has a variable slope. The CLK1 pulses are shown being provided to the flip flop 70. The error amplifier 50 output voltage EAOUT is shown in FIG. 4B for various load conditions. As shown in the left hand portion of FIG. 4B, when the ramp voltage to PWM comparator 90, herein identified as PWM ramp 1, equals the error amplifier 50 output voltage, the high side transistor is turned off and the low side transistor is turned on as shown in FIGS. 4C and 4D. At the next clock pulse (CLK1), the error amplifier output has increased, indicating that the output voltage has dropped due to higher current demands. Accordingly, the ramp voltage will equal the error amplifier voltage only after the ramp voltage has increased to a higher voltage level. This will ensure that the high side transistor has an increased duty cycle, that is, the pulse width is longer as shown in FIG. 4C, thus increasing the output current supplied to the phase 1 inductor. Correspondingly, the low side transistor will be off for a longer period of time as shown in FIG. 4D.

By the third clock pulse, as shown in FIG. 4, the error amplifier input is nearly zero, thus indicating that the current demands have decreased or there is a fault. If the error amplifier's output voltage drops below 0.55 volts, a zero percent duty cycle comparator 160 (FIG. 2) also turns off the low side transistor. As shown, the high side transistor is also off during this period.

By the fourth clock pulse of FIG. 4, the error amplifier output voltage has again increased and the ramp is shown in FIG. 4B and the gate drives are as shown in FIGS. 4C and 4D.

As shown in FIG. 3C, the circuit of the invention allows sharing of current by adjusting the slope of the ramp voltage to at least one, but not all of the PWM comparators. For a two phase converter, the slope of the ramp for only one phase is adjusted. For a three phase converer, two ramp slopes are adjusted. The slope of the ramp provided to the first comparator 90 provided at its non-inverting input is always constant as shown by fixed ramp 1 in FIG. 3D. For example, if the current demanded in phase 1 increases, this will be sensed at the node of resistor RCS1 and CCS1. The increased current will be reflected at the non-inverting input of amplifier 140, which is added to voltage VDAC by a summing stage 170. The increased output of the summing stage 170 is provided to the non-inverting input of the share adjust error amplifier 130, increasing the output of the share adjust error amplifier. This will increase the current through the current source 190, shunting current away from the capacitor 120, thereby increasing the time required to charge capacitor 120. The slope will flatten out as shown in FIG. 3D by the ramp 2 waveform having a longer duty cycle. This will cause the output of the PWM comparator 100 to stay low longer, thus ensuring that the flip flop 80 will remain set, keeping the high side transistor H2 on for a longer period of time, thus increasing the current available from the second phase. Thus, the second phase matches an increased current demanded by the first phase. As the second phase current increases, the first phase will compensate by decreasing until both phase currents are equal. This will occur because the error amplifier output will also decrease as the current supplied by the second phase increases.

Similarly, should the current in the second phase increase as sensed by the sense voltage CSINP2, the output of amplifier 150 will increase and hence the inverting input to the share adjust error amplifier 130 will increase, decreasing the output of the share adjust error amplifier. This will decrease the current shunted by current source 190, allowing capacitor 120 to charge more quickly and thus the ramp 2 voltage has a higher slope as indicated in FIG. 3D. Thus, the PWM comparator output will go high more quickly, resetting flip flop 80 and thereby turning off the high side transistor H2 thereby decreasing the current supplied by the second phase.

At the same time, the error amplifier 50 output will have increased, thus lengthening the on time of the high side transistors of both phases. To compensate for the decreased current caused by the reduced ramp 2 slope, the first phase will supply current to match the reduced current supplied by the second phase. The current supplied by the two phases will be driven such that the error across the share adjust error amplifier inputs is driven to zero.

Conversely, should the current in phase 1 decrease, the non-inverting input of amplifier 130 will decrease, causing the output of amplifier 130 to decrease, resulting in capacitor 120 charging more quickly, turning off the high side transistor of phase 2 more quickly, reducing the phase 2 current to match phase 1.

Should the current in phase 2 decrease, the voltage at the inverting input of amplifier 130 will decrease, causing capacitor 120 to charge less quickly, increasing the current supplied by the phase 2 transistors. The phase 1 transistors will compensate by decreasing the current they supply to match the phase 2 transistors. Once the amplifier 130 inputs are equal, the output phase currents will be equal.

In all cases, although the error amplifier 50 output tracks the output current demands (it increases when the output current demand increases and decreases when the output current demand decreases), the share adjust amplifier 130 operates to equalize the currents in the plurality of phases. Accordingly, although the error amplifier 50 will operate to increase or decrease the current in all phases, as demanded by the load, the share adjust amplifier will operate to increase or decrease the currents supplied by the phases having PWM comparators driven by variable slope ramp signals to equalize the load currents in all the phases.

Adaptive voltage positioning is used to reduce output voltage deviations during load transients and power dissipation of the load when it is drawing maximum current. The circuitry related to voltage positioning is shown in FIG. 2. Resistor RFB is connected between the inverting input of error amplifier 50 (pin FB) and the converter output voltage. An internal current source 200 whose value is programmed by the same external resistor that programs the oscillator frequency, $R_{ROSC}$, pumps current out of the FB pin. The FB bias current develops a positioning voltage drop across RFB which forces the converter's output voltage lower to V(VDAC)–I(FB)*RFB to maintain a balance at the error amplifier 50 inputs. RFB is selected to program the desired amount of fixed offset voltage below the DAC voltage.

The voltage at the VDRP pin is an average of both phase current sense amplifiers 140 and 150 and represents the sum of the VDAC voltage and the average inductor current of all the phases. The VDRP pin is connected to the FB pin through the resistor RDRP. The error amplifier 50 forces the voltage on the FB pin to equal VDAC through the power supply loop. Therefore, the current through RDRP is equal to (VDRP–VDAC)/$R_{DRP}$. As the load current increases, the VDRP voltage increases accordingly, which results in an increased RFB current, further positioning the output regulated voltage lower, thus making the output voltage reduction proportional to an increase in load current. The droop impedance or output impedance of the converter can thus be programmed by the resistor RDRP. The offset and slope of the converter output impedance are independent of the VDAC voltage.

AMD specifies the acceptable power supply regulation window as ±50 mV around AMD's specified VID table voltages. The VID table voltages are available in specifications from the chip manufacturers. Intel, for the VR-10.0, specifies the VID table voltages at the absolute maximum power supply voltage. In order to have all three DAC options, the HAMMER and ATHLON DAC output voltages are pre-positioned 50 mV higher than listed in AMD specifications. During testing, a series resistor is placed between EAOUT and FB to cancel the additional 50 mV out of the digital to analog converter. The FB bias current, equal to IROSC, develops the 50 mV cancellation voltage. Trimming the VDAC voltage by monitoring V(EAOUT) is with this 50 mV cancellation resistor in circuit also trims out errors in the FB bias current.

The VDRP pin voltage represents the average current of the converter plus the DAC voltage. The load current can be retrieved by subtracting the VDAC voltage form the VDRP voltage.

Figure 5A:
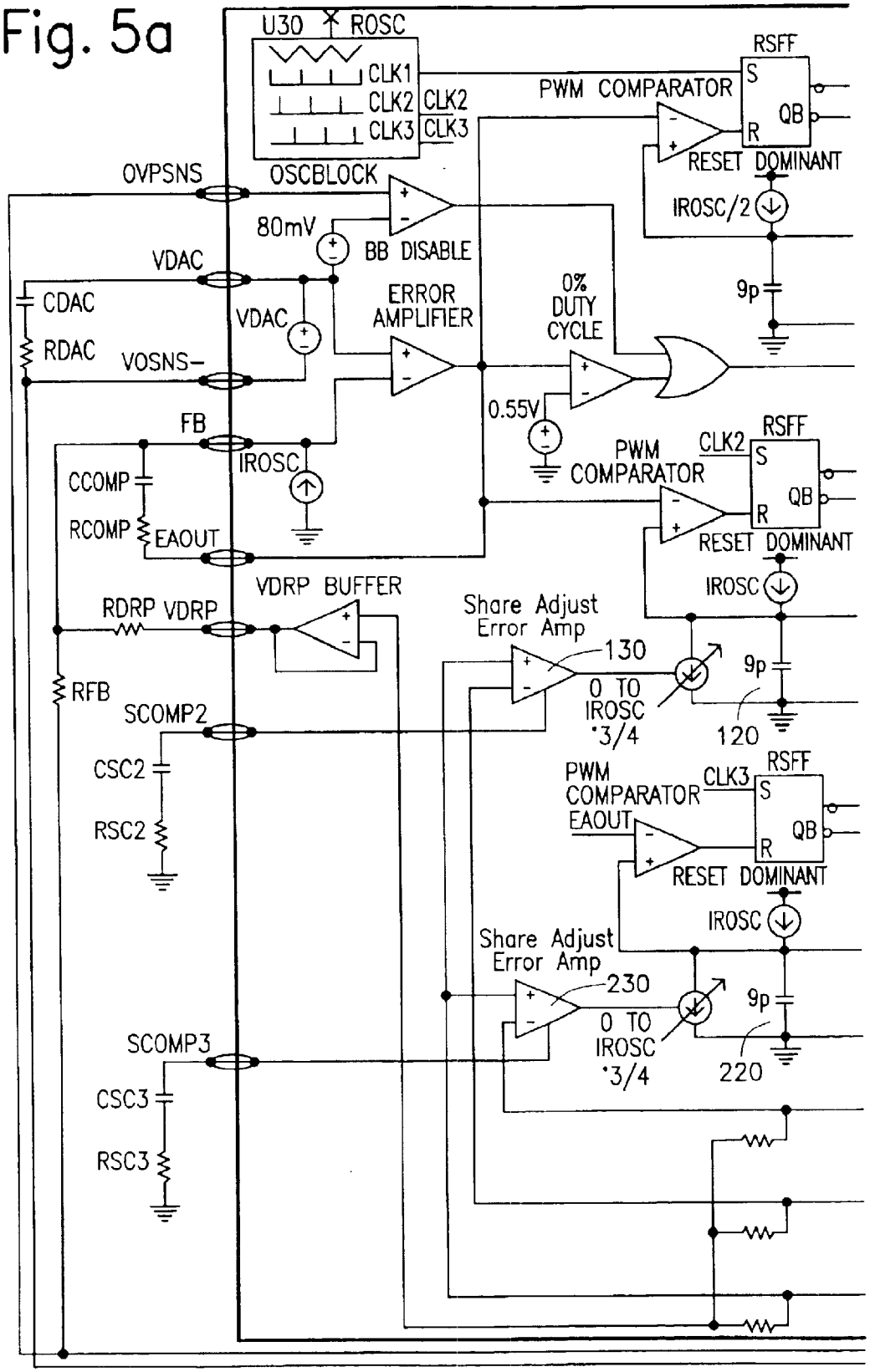
FIG. 5 shows the block diagram for a three phase converter employing the present invention.
Figure 5B:
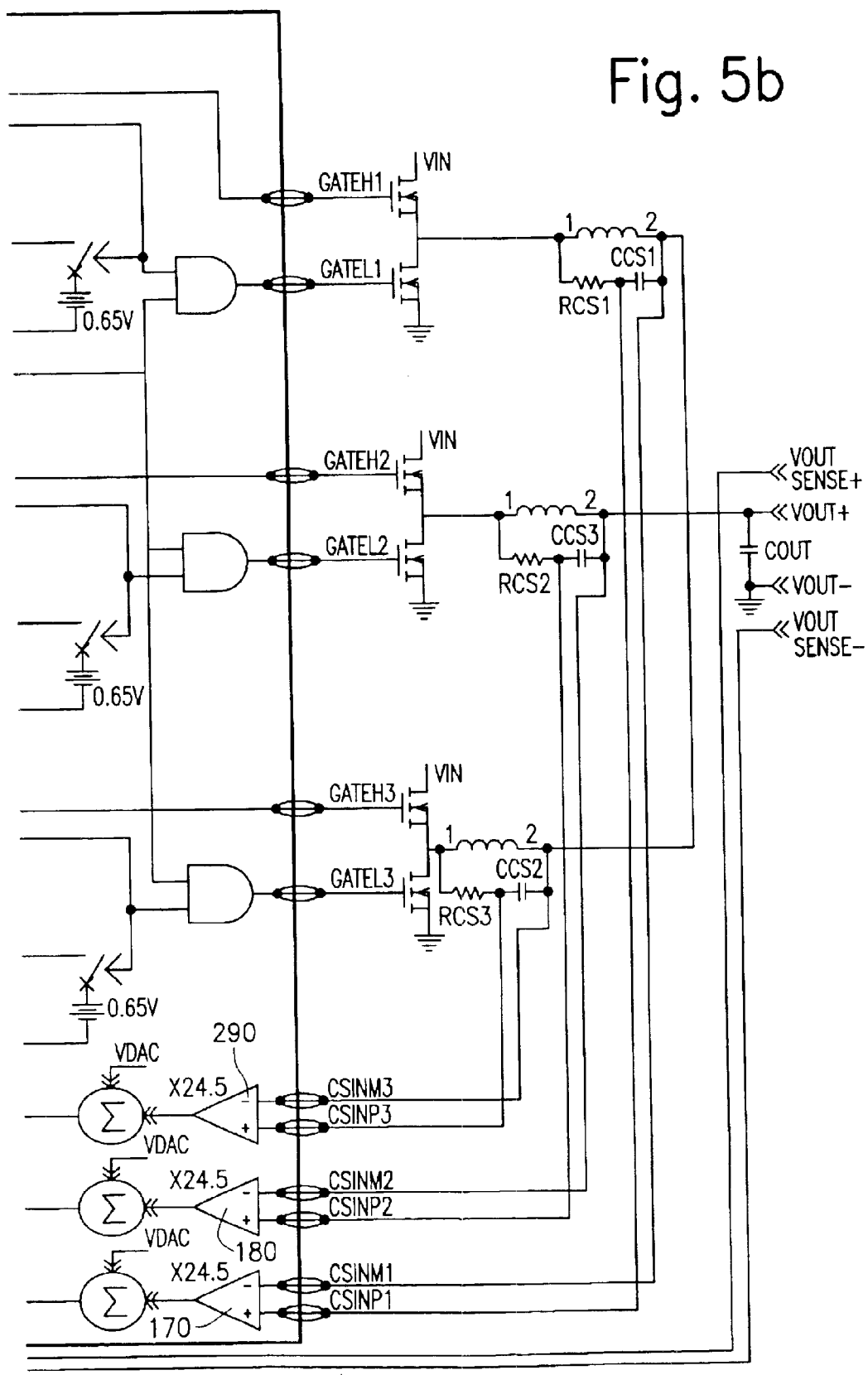

Although the present invention has been described with reference to a 2 phase converter, the invention is also applicable to more than 2 phases. For example, FIG. 5 shows the invention used in adjusting the current shared amongst three phases of a three phase converter. Two share adjustment amplifiers are used, each adjusting a variable slope ramp generator including respective capacitors 120 and 220. Share adjust amplifier 130 receives inputs from phases 1 and 2 from current sense amplifiers 170 and 180. Share adjust amplifier 230 receives inputs from phases 1 and 3 from current sense amplifiers 170 and 290. In this way, share adjust amplifier 130 equalizes phases 1 and 2 and share adjust amplifier 230 equalizes phases 1 and 3, thus equalizing the currents in all phases. The first phase, as in the two phase converter, employs a fixed slope ramp generator.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A multiple phase DC—DC converter comprising:
    a first series circuit comprising first and second output transistors coupled across an input voltage, a first output terminal comprising a first phase voltage being provided at a first common connection between the first and second transistors;
    at least one second series circuit comprising third and fourth output transistors coupled in series across the input voltage, a second output terminal comprising a second phase voltage being provided at a second common connection between the third and fourth transistors of the at least one second series circuit;
    a first output inductor coupled between the first output terminal and an output voltage terminal of the converter;
    at least one second output inductor coupled between the second output terminal and the output voltage terminal of the converter;
    an output capacitor coupled to the output voltage terminal;
    a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first pulse width modulator comparator;

at least one second pulse width modulator circuit for driving the third and fourth transistors, the at least one second pulse width modulator circuit comprising a second pulse width modulator comparator and a variable slope ramp generator, the variable slope ramp generator supplying a variable slope ramp signal to one input of the second pulse width modulator comparator;

an error amplifier for comparing the output voltage of the converter to a reference voltage and providing an error amplifier output voltage to respective second terminals of each of the first and second pulse width modulator comparators;

a first current sense amplifier for determining the phase current in a first phase of the converter provided by the first series circuit;

at least one second current sense amplifier for determining the phase current in at least one second phase of the converter provided by the at least one second series circuit; and at least one share adjust amplifier for receiving outputs from each of the first and at least one second current sense amplifiers and adjusting the slope of the variable slope ramp signal provided by the variable slope ramp generator to adjust the current provided by the at least one second series circuit thereby to equalize the currents provided by the first and at least one second phases.

2. The converter of claim 1, wherein the at least one share adjust error amplifier has first and second inputs, the first and second current sense amplifiers providing respective outputs to the first and second inputs.

3. The converter of claim 1, wherein the fixed slope ramp generator comprises a first current source charging a first capacitor.

4. The converter of claim 3, wherein the variable slope ramp generator comprises a second current source charging a second capacitor and a variable current source for shunting current away from said second capacitor thereby changing the rate at which said second capacitor charges, thereby varying the slope of the variable slope ramp signal.

5. The converter of claim 4, further comprising a first switching circuit coupled across said first capacitor, said switching circuit operating to initiate charging of the first capacitor.

6. The converter of claim 5, further comprising a second switching circuit coupled across the second capacitor, said second switching circuit operating to initiate charging of the second capacitor.

7. The converter of claim 4, wherein the second current source produces a second current and said first current source produces a first current equal to one half the second current, and said variable current source shunts a controlled current away from said second current source in response to an output of the share adjust error amplifier ranging between zero and three fourths said second current.

8. A two-phase DC—DC converter comprising:

a first series circuit comprising first and second output transistors coupled across an input voltage, a first output terminal comprising a first phase voltage being provided at a first common connection between the first and second transistors;

a second series circuit comprising third and fourth output transistors coupled in series across the input voltage, a second output terminal comprising a second phase voltage being provided at a second common connection between the third and fourth transistors;

a first output inductor coupled between the first output terminal and an output voltage terminal of the converter;

a second output inductor coupled between the second output terminal and the output voltage terminal of the converter;

an output capacitor coupled to the output voltage terminal;

a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first pulse width modulator comparator;

a second pulse width modulator circuit for driving the third and fourth transistors, the second pulse width modulator circuit comprising a second pulse width modulator comparator and a variable slope ramp generator, the variable slope ramp generator supplying a variable slope ramp signal to one input of the second pulse width modulator comparator;

an error amplifier for comparing the output voltage of the converter to a reference voltage and providing an error amplifier output voltage to respective second terminals of each of the first and second pulse width modulator comparators;

a first current sense amplifier for determining the phase current in a first phase of the converter provided by the first and second transistors;

a second current sense amplifier for determining the phase current in a second phase of the converter provided by the third and fourth transistors; and a share adjust amplifier for receiving outputs from each of the first and second current sense amplifiers and adjusting the slope of the variable slope ramp signal provided by the variable slope ramp generator to adjust the current provided by the third and fourth transistors thereby to equalize the currents provided by the first and second phases.

9. The converter of claim 8, wherein the share adjust error amplifier has first and second inputs, the first and second current sense amplifiers providing respective outputs to the first and second inputs.

10. The converter of claim 8, wherein the fixed slope ramp generator comprises a first current source charging a first capacitor.

11. The converter of claim 10, wherein the variable slope ramp generator comprises a second current source charging a second capacitor and a variable current source for shunting current away from said second capacitor thereby changing the rate at which said second capacitor charges, thereby varying the slope of the variable slope ramp signal.

12. The converter of claim 11, further comprising a first switching circuit coupled across said first capacitor, said switching circuit operating to initiate charging of the first capacitor.

13. The converter of claim 12, further comprising a second switching circuit coupled across the second capacitor, said second switching circuit operating to initiate charging of the second capacitor.

14. The converter of claim 11, wherein the second current source produces a second current and said first current source produces a first current equal to one half the second current, and said variable current source shunts a controlled current away from said second current source in response to an output of the share adjust error amplifier ranging between zero and three fourths said second current.

15. A method of equalizing load current amongst the output phases of a multiple phase converter, wherein the converter comprises a first series circuit comprising first and second output transistors coupled across an input voltage, a first output terminal comprising a first phase voltage being provided at a first common connection between the first and second transistors; at least one second series circuit comprising third and fourth output transistors coupled in series across the input voltage, a second output terminal comprising a second phase voltage being provided at a second common connection between the third and fourth transistors; a first output inductor coupled between the first output terminal and an output voltage terminal of the converter; at least one second output inductor coupled between the second output terminal and the output voltage terminal of the converter; and an output capacitor coupled to the output voltage terminal;

the method comprising:

comparing the output voltage of the converter to a reference voltage and providing an error amplifier output voltage to each of first and at least one second pulse width modulator comparators;

comparing with the first pulse width modulator comparator a first fixed slope ramp signal with the error amplifier output;

comparing with the at least one second pulse width modulator comparator a variable slope ramp signal with the error amplifier output;

determining the phase current in a first phase of the converter provided by the first series circuit;

determining the phase current in at least one second phase of the converter provided by the at least one second series circuit; and in response to the determined currents in the first phase and the at least one second phase adjusting the slope of the variable slope ramp signal to adjust the current provided by the at least one second series circuit thereby to equalize the currents provided by the first and at least one second phases.

16. The method of claim 15, further comprising generating the fixed slope ramp signal by charging a first capacitor from a first current source.

17. The method of claim 16, further comprising generating the variable slope ramp signal by charging a second capacitor from a second current source and providing a variable current source for shunting current away from said second capacitor thereby changing the rate at which said second capacitor charges, thereby varying the slope of the variable slope ramp signal.

18. The method of claim 17, further comprising operating a first switching circuit coupled across said first capacitor to initiate charging of the first capacitor.

19. The method of claim 18, further comprising operating a second switching circuit coupled across the second capacitor to initiate charging of the second capacitor.

20. The method of claim 17, wherein the second current source produces a second current and said first current source produces a first current equal to one half the second current, and said variable current source shunts a controlled current away from said second current source ranging between zero and three fourths said second current.

21. A three phase DC—DC converter comprising:

a first series circuit comprising first and second output transistors coupled across an input voltage, a first output terminal comprising a first phase voltage being provided at a first common connection between the first and second transistors;

a second series circuit comprising third and fourth output transistors coupled in series across the input voltage, a second output terminal comprising a second phase voltage being provided at a second common connection between the third and fourth transistors;

a third series circuit comprising fifth and sixth output transistors coupled in series across the input voltage, a third output terminal comprising a third phase voltage being provided at a third common connection between the fifth and sixth transistors;

a first output inductor coupled between the first output terminal and an output voltage terminal of the converter;

a second output inductor coupled between the second output terminal and the output voltage terminal of the converter;

a third output inductor coupled between the third output terminal and the output voltage terminal of the converter;

an output capacitor coupled to the output voltage terminal;

a first pulse width modulator circuit for driving the first and second transistors, the first pulse width modulator circuit comprising a first pulse width modulator comparator and a first fixed slope ramp generator, the first fixed slope ramp generator supplying a fixed slope ramp signal to one input of the first pulse width modulator comparator;

a second pulse width modulator circuit for driving the third and fourth transistors, the second pulse width modulator circuit comprising a second pulse width modulator comparator and a first variable slope ramp generator, the first variable slope ramp generator supplying a first variable slope ramp signal to one input of the second pulse width modulator comparator;

a third pulse width modulator circuit for driving the fifth and sixth transistors, the third pulse width modulator circuit comprising a third pulse width modulator comparator and a second variable slope ramp generator, the second variable slope ramp generator supplying a second variable slope ramp signal to one input of the third pulse width modulator comparator;

an error amplifier for comparing the output voltage of the converter to a reference voltage and providing an error amplifier output voltage to respective second terminals of each of the first, second and third pulse width modulator comparators;

a first current sense amplifier for determining the phase current in a first phase of the converter provided by the first and second transistors;

a second current sense amplifier for determining the phase current in a second phase of the converter provided by the third and fourth transistors; and a third current sense amplifier for determining the phase current in a third phase of the converter provided by the fifth and sixth transistors;

a first share adjust amplifier for receiving outputs from each of the first and second current sense amplifiers and adjusting the slope of the first variable slope ramp signal provided by the first variable slope ramp generator to adjust the current provided by the third and fourth transistors;

a second share adjust amplifier for receiving outputs from each of the first and third current sense amplifiers and adjusting the slope of the second variable slope ramp signal provided by the second variable slope ramp generator to adjust the current provided by the fifth and sixth transistors, thereby equalizing the currents provided by the first, second and third phases.

* * * * *